(12) United States Patent
Matsumoto et al.

(10) Patent No.: US 6,968,496 B1
(45) Date of Patent: Nov. 22, 2005

(54) OPTICAL DISK WITH ERROR DETECTION CODE AND OPTICAL DISK APPARATUS

(75) Inventors: Toshio Matsumoto, Kyoto (JP); Yasumori Hino, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 538 days.

(21) Appl. No.: 10/130,571

(22) PCT Filed: Nov. 17, 2000

(86) PCT No.: PCT/JP00/08147

§ 371 (c)(1),
(2), (4) Date: May 17, 2002

(87) PCT Pub. No.: WO01/39191

PCT Pub. Date: May 31, 2001

(30) Foreign Application Priority Data

Nov. 19, 1999 (JP) .................................. 11-329265

(51) Int. Cl.[7] .......................................... G06F 11/00
(52) U.S. Cl. ........................ 714/798; 714/799; 714/763
(58) Field of Search ............................. 714/762, 763, 714/768, 798, 799, 775

(56) References Cited

U.S. PATENT DOCUMENTS 6,058,084 A * 5/2000 Yamamoto et al. ........... 360/51
6,172,952 B1 * 1/2001 Inokuchi et al. ......... 369/47.55

FOREIGN PATENT DOCUMENTS

| EP | 1 079 376 | 2/2001 | ........... G11B 7/007 |
| JP | 55-135313 | 10/1980 | ........... G11B 5/09 |
| JP | 63-287079 | 12/1986 | |
| JP | 7-105628 | 4/1995 | |

* cited by examiner

*Primary Examiner*—Albert Decady
*Assistant Examiner*—Esaw Abraham
(74) *Attorney, Agent, or Firm*—Hamre, Schumann, Mueller & Larson, P.C.

(57) ABSTRACT

An optical disk can detect reliable address data without the need of checking the validity of synchronous detection of segment numbers. The optical disk has one or more tracks, and address data is arranged in a distributed manner on the tracks. A generating polynomial that generates an error detection code of a segment number included in the address data, which represents location information in the disk rotatory direction, is made different from a generating polynomial that generates an error detection code of a track number included in the address data, which represents location information in the disk radial direction.

10 Claims, 17 Drawing Sheets

US 6,968,496 B1

OPTICAL DISK WITH ERROR DETECTION CODE AND OPTICAL DISK APPARATUS

TECHNICAL FIELD

The present invention relates to an optical disk recording medium for reproducing and recording data with a laser beam and an optical disk apparatus using the optical disk recording medium.

BACKGROUND ART

Recently, optical disks have been put into practical use as part of the mainstream of recording media dealing with large-capacity data such as multimedia data. However, with the further development of multimedia contents, recording media like the optical disk or something with larger capacity are demanded.

In response to such a demand, in order to reduce a redundancy of address data, it has been proposed to eliminate special synchronous patterns for synchronous processing of addresses and address information has been recorded in a distributed manner on the large-capacity recording medium (See Japanese Patent Application No. 11 (1999)-021885). Consequently, synchronous processing of address data when reproducing such data increasingly becomes important.

More specifically, an optical disk having one or more tracks on which address data is arranged, where address marks for identifying a starting point of the address data are not necessary, and, for example, one bit of address information is distributed in separated regions, has become used. Therefore, in order to reproduce the address information securely, errors in synchronous points should be avoided.

FIGS. 11A and 11B show a construction of such an optical disk. FIG. 11A is a plan view showing a construction of an optical disk according to the prior art. In FIG. 11A, numeral 1001 indicates a substrate, 1002 indicates a recording film, 1003 indicates a first track, 1004 indicates a second track, and 1005 indicates a segment formed by dividing a track, respectively.

FIG. 11B shows a construction of a segment in an optical disk according to the prior art. As shown in FIG. 11B, at the head of the segment 1005, a clock pit 1006 for generating clocks, wobble pits 1007 and 1008 for obtaining signals for tracking, an address pit 1009 arranged so that address data is distributed for every one bit, are arranged.

FIG. 12 shows the structure of address data itself, arranged in a distribute manner. In FIG. 12, numeral 1101 indicates a segment number, 1102 indicates an error detection code for detecting errors in the segment number 1101, 1103 indicates a track number of the track 1003, 1104 indicates an error detection code of the track number 1103, 1105 indicates a track number of the track 1004, and 1106 indicates an error detection code of the track number 1105, respectively.

Here, the segment number 1101 is 10 bits in size, the track numbers 1103 and 1105 are 14 bits in size, and the error detection code 1102 of the segment number and the error detection codes 1104 and 1106 for the track numbers are 14-bit CRC error detection codes.

In FIG. 12, address pits 1009 in eighty segments make up one group of address information. Since one track is made up of 1,280 segments, sixteen groups of address information can be generated for one track.

In addition, information indicated by 1101 and 1102, which is common with adjacent tracks, is recorded on both of the first track 1003 and the second track 1004, and thus this information can be read out without the need of tracking control.

Further, the track number 1103 and the error detection code 1104 of the first track 1003, and the track number 1105 and the error detection code 1106 of the second track 1004 are arranged so that their address pits 1009 are not adjacent to each other between adjacent tracks. With this arrangement, errors in reading-out of addresses due to crosstalk by the adjacent tracks can be decreased.

The following describes synchronous processing of data to be demodulated using the above-stated optical disk. FIG. 13 is a block diagram of an address demodulator that demodulates addresses using the above-stated optical disk, and FIG. 14 is a timing chart of the address demodulator.

In FIG. 13, numeral 1201 indicates a clock pit detector, 1202 indicates a PLL that generates a clock for address demodulation from a clock pit, 1203 indicates a discriminator that discriminates between '1' and '0' of address data at the falling edge of the PLL clock, 1204 indicates a register that stores demodulated data, 1205 indicates a timing generator that generates the demodulated timings for the segment number 1101 and the accompanying error detection code 1102, and 1206 indicates a CRC error detector that detects errors in contents in the register 1204 in response to an output from the timing generator 1205, respectively.

In addition, numeral 1207 indicates state discriminating means that discriminates the presence or absence of synchronous errors in addresses, 1211 indicates segment number management means that discriminates among segments, 1208 indicates a timing generator that generates the demodulated timings for the track numbers 1103 and 1105 and the accompanying error detection codes 1104 and 1106, 1209 indicates an error detector that detects errors in track numbers, and 1212 indicates a track number detector that detects a track number, respectively.

Firstly, a reference clock for demodulating addresses is generated. The reference clock is generated from a clock pit. As shown by numeral 1301 in FIG. 14, in the case where a distance between a clock pit 1006 at the head of the segment 1005 and a clock pit 1006 at the head of the next segment is two-hundred address data bits, a clock having a frequency two-hundred times as many as a clock pit signal 1302 detected by the clock pit detector 1201 is generated by the PLL 1202, whereby a clock 1303 in synchronization with the address data bit can be obtained. At the falling edge of this PLL clock 1303, the discriminator 1203 discriminates between '1' and '0', and demodulated data indicated by numeral 1304 is stored in the register 1204. Out of these demodulated data 1304, data of the total number of bits of the segment number and the accompanying error detection code of the immediately preceding demodulated data are input into the error detector 1206 in response to an output signal 1308 from the timing generator 1205 so as to conduct error judgement.

Then, an output signal 1305 from the error detector 1305 and contents in the register 1204 are input into the state discriminating means 1207, where the validity of the synchronous detection of address is checked. For instance, it is assumed that, when synchronization is detected for the first time, the detected segment number is X. If this synchronization is valid, then the segment number Y to be detected at the next timing would be eighty segments ahead from X. Therefore, Y must be equal to (X+80), or have a correlation with X. That is, by utilizing the continuity of segment numbers, the validity of the immediately preceding detected segment number can be checked, and thus the validity of synchronous detection of addresses also can be checked.

If the above-described state discriminating means 1207 judges the absence of synchronous errors, an output signal 1309 becomes '1', which means that address synchronization has been established, and the output signal and contents in the register 1204 are input into the segment number management means 1211.

The segment number management means 1211 detects a segment number from the contents in the register 1204 and manages segment numbers by setting the detected number as an initial value, and adding '1' into the initial value in response to every predetermined signal, from which a segment can be distinguished, such as a clock pit signal 1302.

The timing generator 1208 generates a timing signal for detecting errors in track numbers based on the output signal 1310 from the segment number management means 1211. In response to the output signal from the timing generator 1208, data of the total number of bits of the track number and the accompanying error detection code of the immediately preceding demodulated data, out of the demodulated data stored in the register 1204, are input into the error detector 1209, where error detection of the track number is conducted. Then, on the basis of an output signal from the error detector 1209 and the data stored in the register 1204, the track number detector 1212 detects a track number.

However, such a distributed arrangement of address data on the disk causes various problems. For instance, as shown in FIG. 15, if defining as a base unit an address frame made up of eighty bits of address data, addresses cannot be demodulated unless predetermined segments of address information are collected, because the address information is distributed on the disk. As a result, only sixteen pieces of address data, which is the same number as that of the address frames, are recorded on the disk. This causes a problem in that a higher degree of reliability is required for each piece of address data as compared with previous ones.

In addition, according to the prior art, the risk of errors in detecting synchronous positions is inherent. If an error is made in detecting synchronous positions, the detection timing for a segment number and a track number also becomes incorrect, and thus the address cannot be read out. Otherwise, such an error might lead to a problem that incorrect address data is read out.

As to errors in synchronous detection, the following two cases can be considered in terms of the structure. As the first case, it can be considered that the same generating polynomial is used for generating error detection codes of the segment number and the track number.

As described above, synchronization of addresses is established by conducting error detection in the segment number and the accompanying error detection code, and therefore CRC error detection codes generally are used as the error detection code. In this case, if the same generating polynomial is used for generating error detection codes of the segment number and the track number, and if higher several bits of the track number are all '0', then their error detection code becomes the same one, even when the numbers of bits of the segment number and the track number are different from each other. For example, assuming that the segment number, the track number, and the error detection code are 10 bits, 14 bits, and 14 bits, respectively, the CRC error detection code in the case of the track number of "00000000001011" becomes "11000000111101", and the error detection code generated from the lower ten bits of the track number also becomes "11000000111101". Therefore, at the timing (1) or (2) indicated by arrows in FIG. 16, an output from the error detector becomes '0', which results in incorrect synchronization.

As the second case, it can be considered that synchronous detection is conducted at an incorrect position, and the obtained segment number is '0'. This is caused by an output from the error detector becoming '0', when inputting '0's in a number as many as the total number of bits of the segment number and the error detection code of the segment number.

That is, as shown in FIG. 17, for example, where the total number of bits of the segment number and the error detection code of the segment number is 24 bits, if 24 bits of '0's are input into the error detector continuously, then an output from the error detector becomes '0'.

In the case where the total number of bits of the track number and the error detection code of the track number is the above-stated 24 bits or more, '0's are present continuously from the 25-th bit to the 52-th bit in the first track 1003, and from the 53-th bit to the 80-th bit in the second track 1004, as shown in FIG. 17. Therefore, there is the risk of incorrect synchronous detection at the timing (1) or (2) indicated by arrows in this figure. Also, there remains the risk of 24 bits or more of '0's being present continuously. In this case as well, an output from the error detector becomes '0', which would result in incorrect synchronous detection.

Hence, in the methods according to the prior art, even when the error detector 1206 conducts synchronous detection so as to detect a segment number, the state discriminating means 1207 has to confirm the continuity of the segment number detected at the next timing so that the validity of the synchronous detection detected immediately before can be checked.

Therefore, reliable track numbers cannot be detected until the next segment number has been detected after synchronous detection by the error detector 1206, that is, after at least one address frame of address information has been demodulated, which hinders a quick operation of the system.

DISCLOSURE OF THE INVENTION

In order to cope with the above-stated problems, the object of the present invention is to provide an optical disk and an optical disk apparatus using the same, which can detect reliable address data without the need of checking the validity of synchronous detection after conducting the synchronous detection so as to detect a segment number.

To fulfill the above object, an optical disk according to the present invention has one or more tracks on which address data is arranged in a distributed manner, the address data including a segment number that represents location information in a rotation direction of the disk, an error detection code of the segment number, a track number that represents location information in a radial direction of the disk, and an error detection code of the track number. Here, information other than the address data, which is used for synchronous detection of the address data, is not recorded on the disk, and the error detection code of the segment number and the error detection code of the track number are generated using different generating polynomials.

With this construction, the situation for agreement between the generated error correcting code of a segment number and the generated error correcting code of a track number can be prevented, whereby synchronization of addresses can be established uniquely. In addition, since state discriminating means for checking the validity of the synchronous detection becomes unnecessary, an address demodulator can be structured with a relatively simple mechanism, and the system can operate at high speed.

In the aforementioned construction, it is preferable that an error correcting code is used as the error detection code of the track number. Since address information is arranged in a distributed manner on the disk, it can be considered that the possibility that reading-out errors occur continuously is low. Thus, it can be expected that correcting errors with the error correcting codes can ensure the reliability of the address data.

In addition, in the aforementioned construction, it is preferable that an error correcting code capable of correction in bits is used as the error correcting code. This is because even when a burst error occurs on the disk, since address information is recorded in a distributed manner, the error can be a random error for the address information.

In addition, in the aforementioned construction, the error correcting code that accompanies the track number preferably is at least 15 bits in size. This is because the address error rate and the incorrect correction rate that are required for optical disk apparatus can be secured with this construction. Further, if the track number is 16 bits in size in the above construction, track addresses can be assigned on optical disks in most sizes.

Next, to fulfill the above-stated object, another optical disk according to the present invention has one or more tracks on which address data is arranged in a distributed manner, the address data including a segment number that represents location information in a rotation direction of the disk, an error detection code of the segment number, a track number that represents location information in a radial direction of the disk, and an error detection code of the track number. Here, the segment number has a value other than zero.

In addition, to fulfill the above-stated object, another optical disk according to the present invention has one or more tracks on which address data is arranged in a distributed manner, the address data including a segment number that represents location information in a rotation direction of the disk, an error detection code of the segment number, a track number that represents location information in a radial direction of the disk, and an error detection code of the track number. Here, if detecting that the segment number is zero, synchronous detection of the address data is not conducted.

With these constructions, if the detected segment number is zero, the detection can be judged as an incorrect synchronous detection. Therefore, synchronous detection at an incorrect timing can be prevented.

Next, to fulfill the above-stated object, another optical disk according to the present invention has tracks, adjacent tracks of which have different tracking polarities, where address data is arranged in a distributed manner on the tracks, and the address data includes a segment number that represents location information in a rotation direction of the disk, an error detection code of the segment number, a track number that represents location information in a radial direction of the disk, and an error detection code of the track number. Here, a pair of adjacent recorded tracks has the same track number. With this construction, even when the adjacent tracks have the same track number, the track to be addressed can be discriminated with the tracking polarity. As a result, the number of bits used for the track number can be omitted, and thus the storage capacity of the optical disk as a whole can be increased.

To fulfill the above-stated object, an optical disk apparatus according to the present invention includes an optical disk having one or more tracks on which address data is arranged in a distributed manner, where the address data comprises a segment number that represents location information in a rotation direction of the disk, an error detection code of the segment number, a track number that represents location information in a radial direction of the disk, and an error detection code of the track number. Here, the error detection code of the segment number and the error detection code of the track number are generated using different generating polynomials, and synchronous detection of the address data is conducted using the segment number. With this construction, the situation for agreement between the generated error correcting code of a segment number and the generated error correcting code of a track number can be prevented, whereby synchronization of addresses can be established uniquely. In addition, an address demodulator can be structured with a relatively simple mechanism, and the system can operate at high speed. Here, according to the optical disk apparatus of the present invention, synchronous detection can be conducted without the need of additional synchronous information, and according to the optical disk of the present invention, there is no restraint on the bit lengths of the segment number and the track number.

BEST MODE FOR CARRYING OUT THE INVENTION

The following describes embodiments of the present invention, with reference to the drawings.

Embodiment 1

Figure 1A:
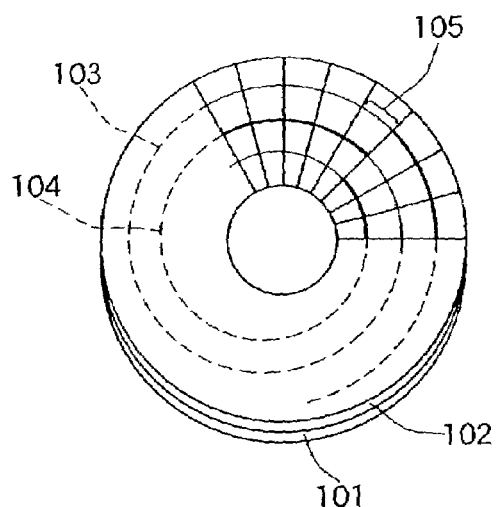
FIG. 1A is a plan view showing a construction of the optical disk according to Embodiment 1 of the present invention.
Figure 1B:
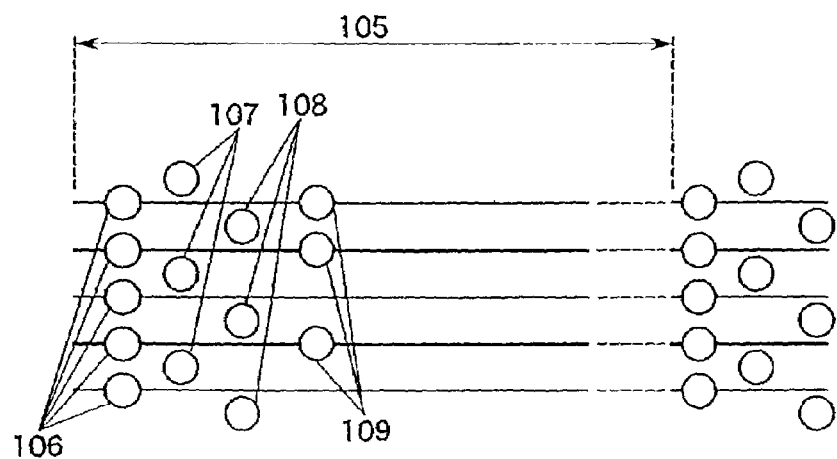
FIG. 1B shows a construction of a segment in the optical disk according to Embodiment 1 of the present invention.

FIGS. 1A and 1B show a construction of an optical disk according to Embodiment 1 of the present invention. FIG. 1A is a plan view showing the construction of the optical disk according to Embodiment 1 of the present invention. In FIG. 1A, numeral 101 indicates a substrate, 102 indicates a recording film, 103 indicates a first track, 104 indicates a second track, and 105 indicates a segment formed by dividing a track, respectively.

FIG. 1B shows a construction of a segment in the optical disk according to Embodiment 1 of the present invention. As shown in FIG. 1B, at the head of the segment 105, a clock pit 106 for generating clocks, wobble pits 107 and 108 for obtaining signals for tracking, and an address pit 109 arranged so that address data is distributed for every one bit, are arranged.

Since the address pits 109 are distributed in the segment 105, time is generated until the next address pit 109 is reproduced after one bit of address pit 109 is reproduced. During this time duration, an error detector operates, whereby the system can operate at high speed.

Figure 2:
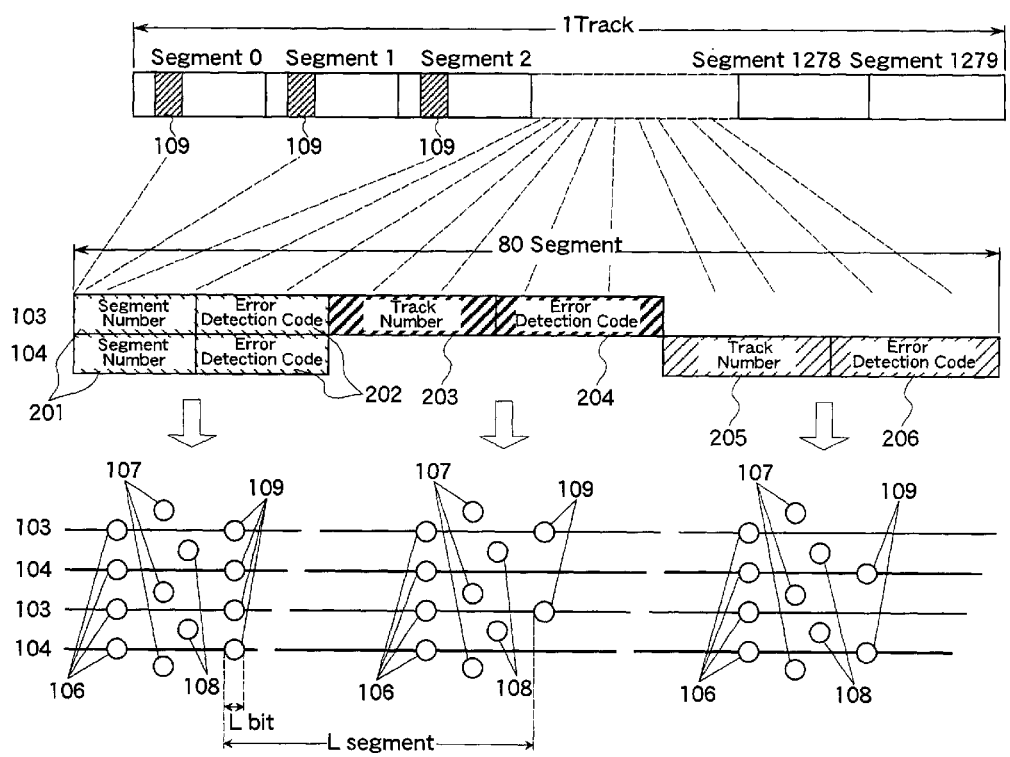
FIG. 2 shows a structure of address data in the optical disk according to Embodiment 1 of the present invention.

FIG. 2 shows the structure of address data itself, arranged in a distributed manner. In FIG. 2, numeral 201 indicates a segment number, 202 indicates an error detection code for detecting errors in the segment number 201, 203 indicates a track number of the track 103, 204 indicates an error detection code of the track number 203, 205 indicates a track number of the track 104, and 206 indicates an error detection code of the track number 205, respectively.

In FIG. 2, address pits 109 in eighty segments make up one group of address information. Since one track is made up of 1,280 segments, sixteen groups of address information are generated for one track.

In addition, information indicated by 201 and 202, which is common with adjacent tracks, is recorded on both of the first track 103 and the second track 104, and thus this information can be read out without the need of tracking control.

Further, the track number 203 and the error detection code 204 of the first track 103, and the track number 205 and the error detection code 206 of the second track 104 are arranged so that their address pits 109 are not adjacent to each other between adjacent tracks. With this arrangement, errors in reading-out of addresses due to crosstalk by the adjacent tracks can be decreased.

Figure 3:
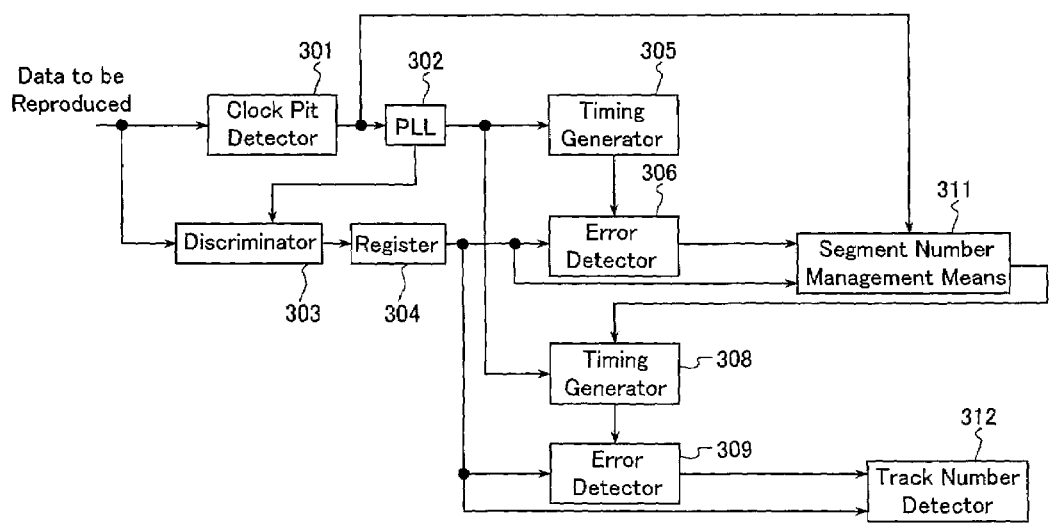
FIG. 3 shows a construction of an address demodulator using the optical disk according to Embodiment 1 of the present invention.
Figure 4:
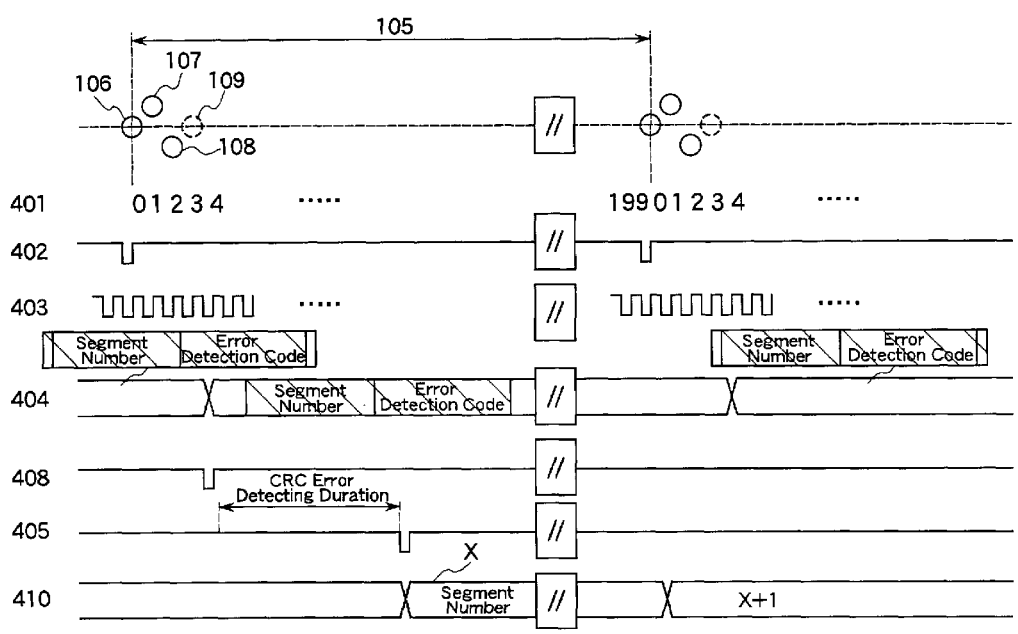
FIG. 4 shows an example of a timing chart of the address demodulator using the optical disk according to Embodiment 1 of the present invention.

The following describes the synchronous processing of data to be demodulated using an optical disk with the above-stated construction. FIG. 3 is a block diagram of an address demodulator that demodulates addresses using the above-stated optical disk, and FIG. 4 is a timing chart of the address demodulator.

In FIG. 3, numeral 301 indicates a clock pit detector, 302 indicates a PLL that generates a clock for address demodulation from a clock pit, 303 indicates a discriminator that discriminates between '1' and '0' of address data at the falling edge of the PLL clock, 304 indicates a register that stores demodulated data, 305 indicates a timing generator that generates the demodulated timings for the segment number 201 and the accompanying error detection code 202, and 306 indicates a CRC error detector that detects errors in contents in the register 304 in response to an output from the timing generator 305, respectively.

In addition, numeral 311 indicates segment number management means that discriminates among segments, 308 indicates a timing generator that generates the demodulated timing for the track numbers 203 and 205 and the accompanying error detection codes 204 and 206, 309 indicates an error detector that detects errors in track numbers, and 312 indicates a track number detector that detects a track number, respectively.

Firstly, a reference clock for demodulating addresses is generated. The reference clock is generated from a clock pit. As shown in FIG. 4, in the case where a distance between a clock pit 106 at the head of the segment 105 and a clock pit 106 at the head of the next segment is two-hundred address data bits, a clock having a frequency two-hundred times as many as a clock pit signal 402 detected by the clock pit detector 301 is generated by the PLL 302, whereby a clock 403 in synchronization with the address data bit can be obtained. At the falling edge of this PLL clock 403, the discriminator 303 discriminates between '1' and '0', and demodulated data indicated by numeral 404 are stored in the register 304.

Out of these demodulated data 404, data of the total number of bits of the segment number and the accompanying error detection code of the immediately preceding demodulated data is input into the error detector 306 in response to an output signal 408 from the timing generator 305 so as to conduct error judgement.

When an output signal 405 from the error detector 306 and contents in the register 304 are input into the segment number detection means 311, the segment number management means 311 detects a segment number from the contents in the register 304 at the timing when the output signal 405 from the error detector 306 becomes '0'. Then, the segment number management means 311 manages segment numbers by setting the detected number as an initial value, and adding '1' into the initial value in response to every predetermined signal, from which a segment can be distinguished, such as a clock pit signal 402.

The timing generator 308 generates a timing signal for detecting errors in track numbers based on the output signal 410 from the segment number management means 311. In response to the output signal from the timing generator 308, data of the total number of bits of the track number and the accompanying error detection code of the immediately preceding demodulated data, out of the demodulated data stored in the register 304, are input into the error detector 309, where error detection of the track number is conducted. Then, on the basis of an output signal from the error detector 309 and the data stored in the register 304, the track number detector 312 detects a track number.

Conventionally, in the optical disk with the above-stated construction, the same generating polynomial is used for generating the error detection code 202 of the segment number and the error detection codes 204 and 206 of the track numbers. In this method, synchronization of addresses is detected by detecting that an output from the CRC error detector 305 becomes '0'. Then, in the case where the higher order bits of the track number are '0', an output from the error detector 306 becomes '0' at the timing when the error detection codes 204 and 206 of the track number are input into the error detector 306, which would result in incorrect synchronous detection.

In view of such a problem, the optical disk apparatus according to Embodiment 1 of the present invention uses error detection codes generated from different generating polynomials for the error detection code 202 of the segment number and the error detection codes 204 and 206 of the track number. For example, if a CRC error detection code is used for the error detection code 202 of the segment number, an error detection code having a different number of bits from the error detection code 202 of the segment number is used for the error detection codes 204 and 206 of the track number, or error correcting codes are used for them.

Note here that, in Embodiment 1, the segment number 201 is 8 bits in size, the track numbers 203 and 205 are 16 bits in size, and the error detection code 202 of the segment number is 10 bits in size, and the error detection codes 204 and 206 of the track numbers are 15-bits in size. The error detection code 202 of the segment number is a CRC error detection code.

Figure 5:
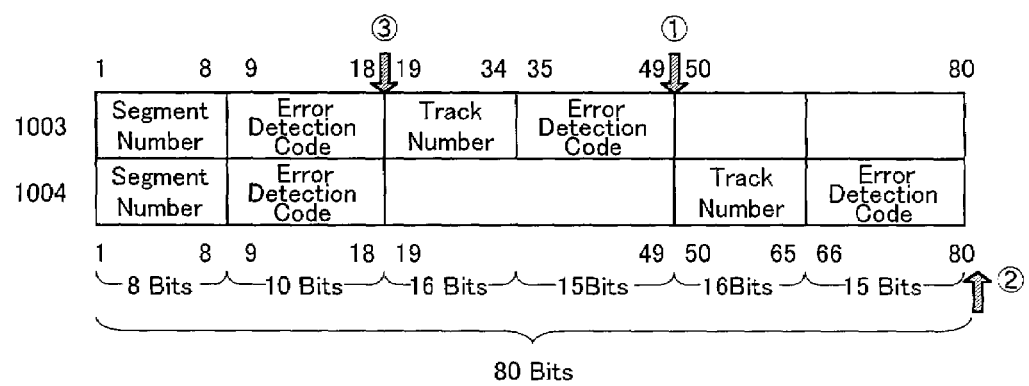
FIG. 5 is a diagram for explaining an address synchronous error in the optical disk according to Embodiment 1 of the present invention.

According to this method, even when higher order bits of the track number are all '0', the error detection codes of the segment number and the track number are made different from each other. In such a case, an output from the error detector does not become '0' at the timing (1) and (2) indicated by arrows in FIG. 5, but does become '0' at the timing (3) only. That is, as shown in FIG. 4, only when all of the segment number 201 and the error detection code 202 of the segment number are input into the error detector 306, a CRC error does not occur, and the output 405 from the error detector 305 becomes '0'.

Figure 13:
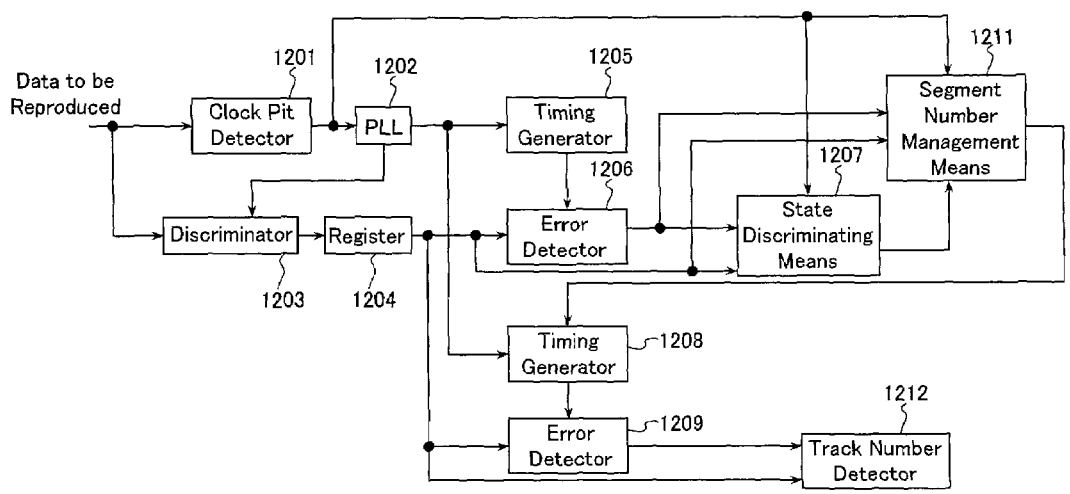
FIG. 13 shows a construction of an address demodulator using the prior art optical disk.
Figure 14:
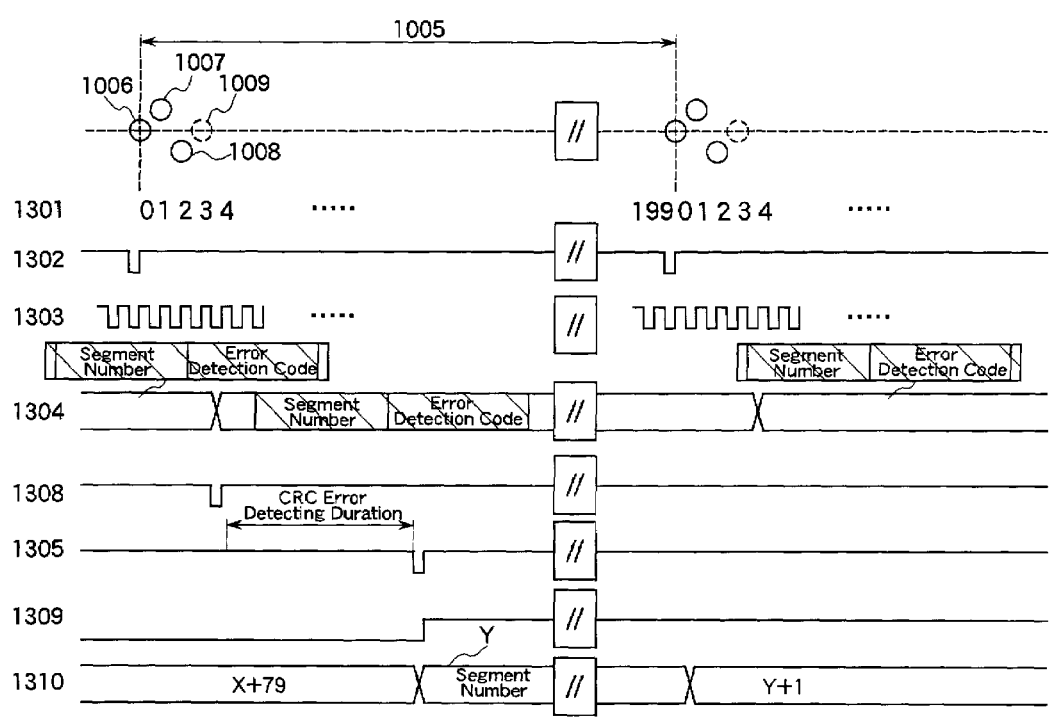
FIG. 14 shows an example of a timing chart of the address demodulator using the prior art optical disk.
Figure 15:
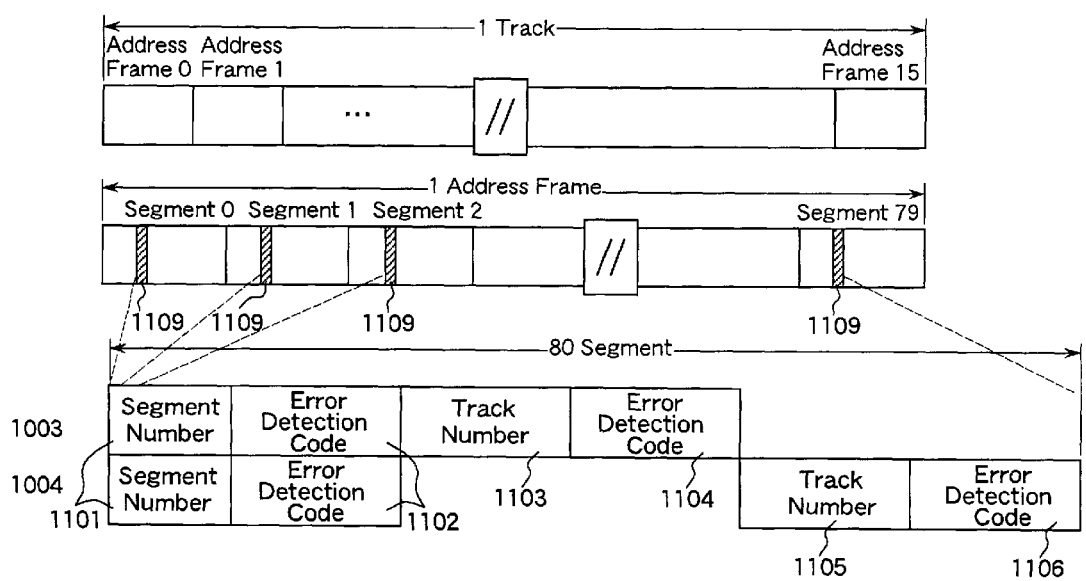
FIG. 15 shows a construction of an address frame.
Figure 16:
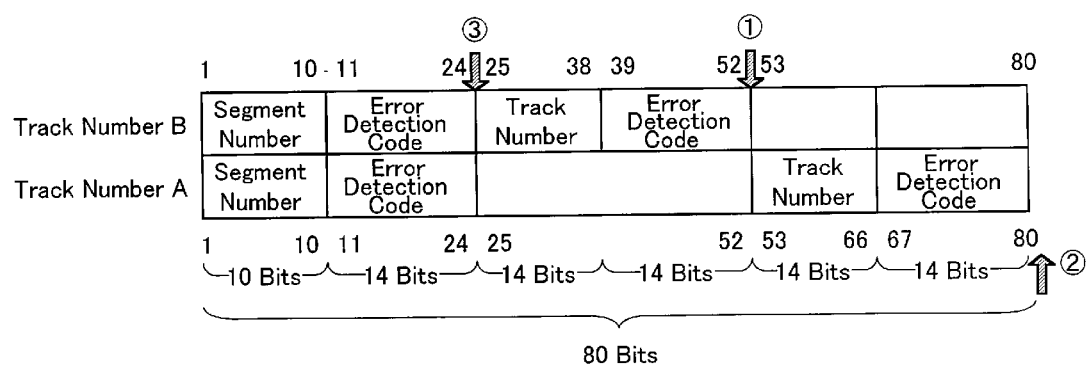
FIG. 16 is a diagram for explaining an address synchronous error in the prior art optical disk.
Figure 17:
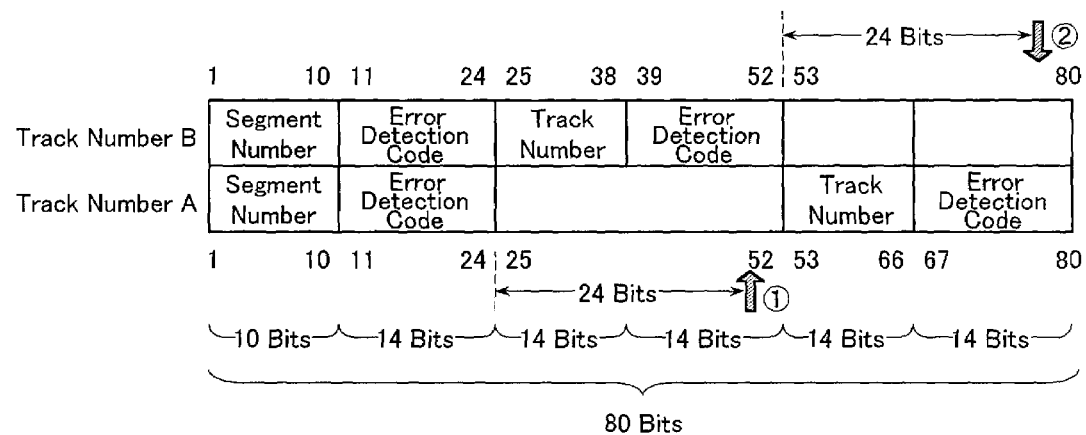
FIG. 17 is a diagram for explaining another address synchronous error in the prior art optical disk.

Therefore, since there is no risk of incorrect synchronous detection as in the prior art examples, establishment of synchronization can be checked at a position free from errors, and thus there is no need for checking the validity of the synchronous detection detected immediately before. As a result, the state discriminating means 1207 provided in FIG. 13 for checking the validity of synchronous detection becomes unnecessary, and therefore addresses can be demodulated with a simple mechanism as shown in FIG. 3.

In addition, since reliable track number can be detected before not more than one address frame of address information is demodulated after the error detector 306 conducts synchronous detection, the system can operate at high speed.

In FIG. 3, for instance, when using error correcting codes for the error detection codes 204 and 206 of the track numbers in FIG. 2, data of the total number of bits of the track number and the accompanying error detection code of the immediately preceding demodulated data, out of the demodulated data stored in the register 304, are input into the error detector 306, where error detection of the track number is conducted. Then, the error detector 309 outputs the presence or absence of errors, the number of errors, and the error generated position. On the basis of the information and the data stored in the register, the track number detector 312 detects a track number.

The reason why the above-stated construction suffices for operation is the follows. That is, since address information is distributed on the disk, even when scratches, fingerprints, or the like are attached onto the disk, it can be considered that the possibility of reading-out errors occurring continuously is low. Thus, it can be expected that the reliability of the address data is improved considerably by, when detecting an error, correcting the error with the error correcting codes.

Figure 6:
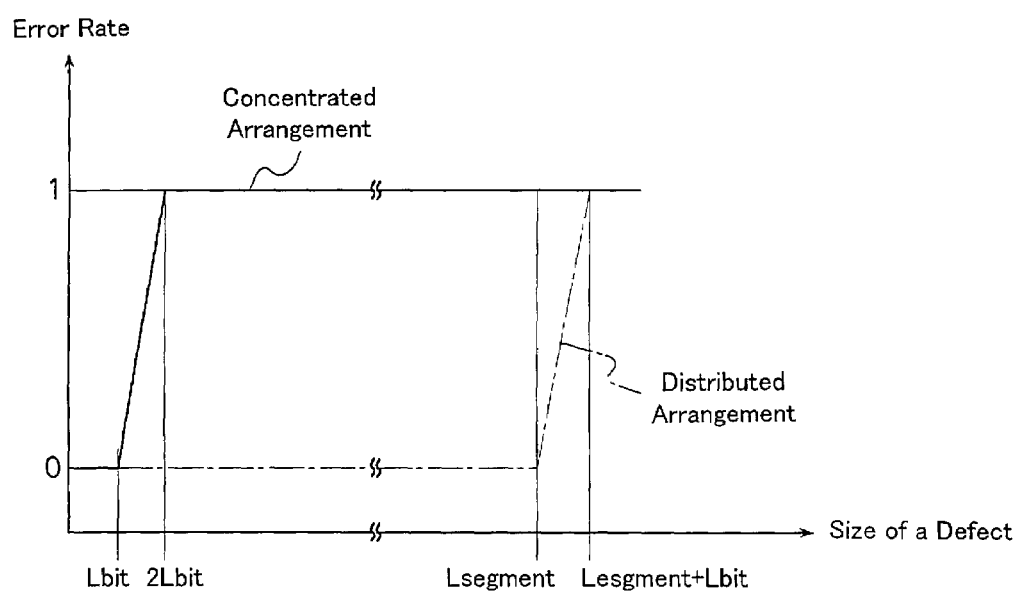
FIG. 6 is a diagram for explaining a state of variation in an error rate in the optical disk according to Embodiment 1 of the present invention.

FIG. 6 shows an error rate of addresses when conducting single error correction with respect to the size of the defect, including cases where address information is arranged in a concentrated manner and arranged in a distributed manner on a disk, where the horizontal axis represents the size of a defect and the vertical axis represents an error rate after error correction. Further, as shown in FIG. 2, a length of the segment 105 and a length of the address pit 109 are Lsegment and Lbit, respectively.

Here, if the missing address information due to a defect is 1 bit or less in size, the information can be corrected by error correction. However, if the missing address information is 2 bits or more in size, the information cannot be corrected, and the error rate becomes '1', which means that the information is recognized as an error.

As shown in FIG. 6, in the case where address information is distributed, the address is recognized as an error when a defect is Lsegment+Lbit or more in size, because only 1 bit of address information is included in one segment, for instance.

On the other hand, in the case where address information is concentrated, the address is recognized as an error when a defect is 2Lbit or more in size, because address data is arranged adjacently on the disk.

Hence, since Lbit and Lsegment approximately are, for example, 0.5 $\mu$m and 100 $\mu$m, respectively, it can be found that employing error correcting codes for optical disks on which address information is arranged in a distributed manner is significantly effective.

Here, it can be considered that employing, as error correcting codes, error correcting codes capable of correction in bits, such as a BCH code, is more effective. This is because even when a burst error occurs on the disk, since address information is recorded in a distributed manner, the error can be a random error for the address information.

When using the BCH code, the following Formula 1 should be satisfied, where k, m, and t indicate information bit, the order of a primitive polynomial, and the correctable bit number, respectively.

$$k \leq 2^m - 1 - mt \qquad \text{(Formula 1)}$$

Here, assuming a disk with a diameter of 12 cm, a track number corresponding to an information bit has to have at least 16 bits or more of bit length. In this case, a value in a range between 0 and 65535 ($=2^{16}-1$) can be represented.

In addition, employing error correcting codes has a problem of incorrect correction, which means a case where a correcting procedure causes correction into an incorrect code. That is, as the bit number to be corrected in the detected error increases, the error rate decreases as shown in FIG. 7, whereas the incorrect correction rate becomes worse as shown in FIG. 8.

Figure 7:
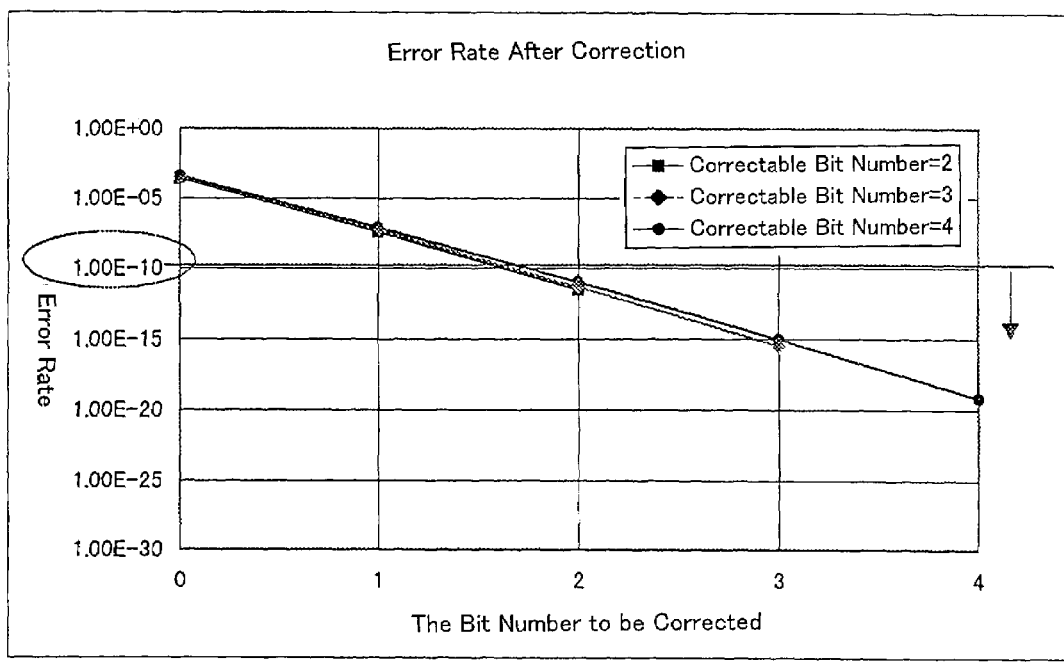
FIG. 7 shows a relationship between the correctable error bit number and the error rate in the optical disk according to Embodiment 1 of the present invention.
Figure 8:
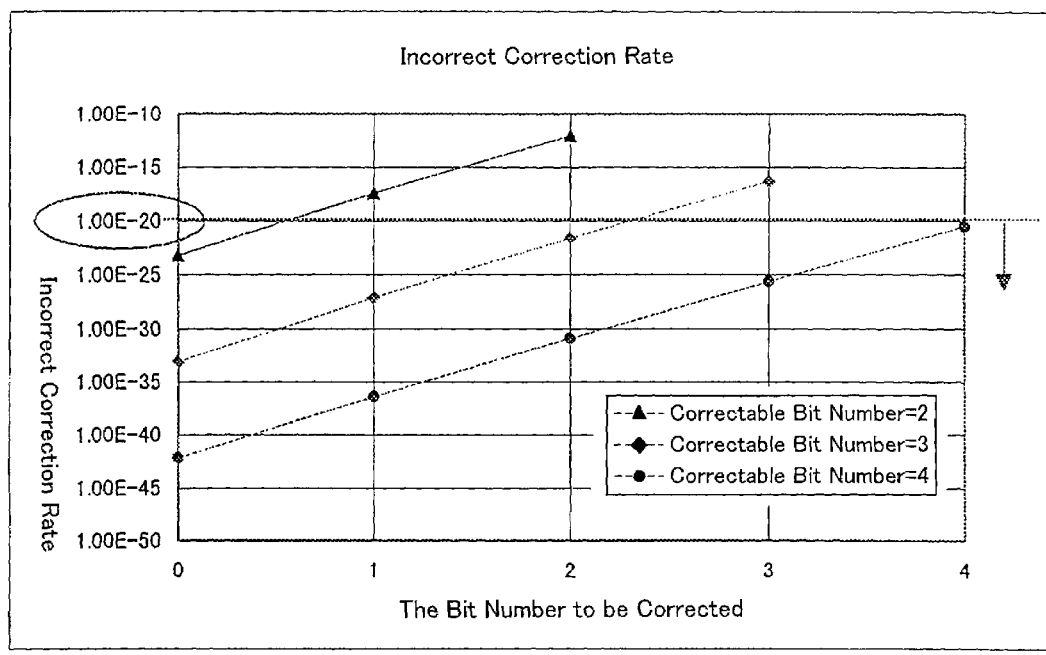
FIG. 8 shows a relationship between the correctable error bit number and the incorrect correction rate in the optical disk according to Embodiment 1 of the present invention.

FIGS. 7 and 8 show a state where the error rate and the incorrect correction rate, respectively, vary with respect to the bit number to be corrected, when the correctable error bit number is set at 2 through 4, respectively. Note here that the correctable error bit number indicates how many of multi-level of error can be corrected, while the bit number to be corrected indicates how many of multilevel of error should be corrected when the data is judged as an error.

For instance, even when the correctable error bit number is 3, if the bit number to be corrected is set at 2 so that correction is not conducted for the judgment of a 3 bit-error, then the incorrect correction rate can be decreased. Here, the bit error rate before correction and at the time of disk reproduction is set at $1.0 \times 10^{-5}$, which is a general value for optical disks.

Firstly, in FIG. 7, the block error rate after correction becomes $1.0\times10^{-10}$, which is required for optical disks in general, when the bit number to be corrected is 2 in the case of the correctable error bit number being 2, when the bit number to be corrected is 2 or 3 in the case of the correctable error bit number being 3, and when the bit number to be corrected is 2, 3, or 4 in the case of the correctable error bit number being 4.

Next, in FIG. 8, both of the incorrect correction rate of $1.0\times10^{-20}$, which is required for optical disks in general, and the error rate condition are satisfied only when the bit number to be corrected is 2 in the case of the correctable error bit number being 3 and when the bit number to be corrected is 2, 3, or 4 in the case of the correctable error bit number being 4. Consequently, it can be found that the correctable error bit number has to be 3 or more.

If the correctable error bit number is set at 3, the order of the primitive polynomial m has to be 5 or more. Assuming that t indicates the correctable error bit number, the generating polynomial for the BCH code is represented as in the following Formula 2.

$$g(x)=LCM[M_1(x),M_3(x),\ldots M_{2t-1}(x)] \quad \text{(Formula 2)}$$

Here, LCM indicates a least common multiple polynomial. Assuming that the correctable error bit number equals 3, the generating polynomial can be represented as in the following Formula 3.

$$g(x)=LCM[M_1(x),M_3(x),M_5(x)] \quad \text{(Formula 3)}$$

In Formulae 2 and 3, $M_i(x)$ is referred to as a minimal polynomial, which can be represented as in the following Formula 4.

$$Mi(x)=(x-\alpha^i)(x-\alpha^{2i})\ldots(x-\alpha^{i2^{(d_i-1)}})$$

where, di indicates the minimal positive integer j satisfying the relationship of $\alpha^{i2^j}=\alpha^i$, and $\alpha^i$ indicates an arbitrary element other than zero for $GF(2^m)$ (Formula 4)

In this case, the orders of the minimal polynomial $M_1(x)$, $M_3(x)$, and $M_5(x)$ become 5, respectively. Consequently, when a BCH generating polynomial is derived from the fifth-order primitive polynomial, the order of the obtained generating polynomial becomes the 15th order (=the 5th×3), and the bit number of the error correcting code generated from the polynomial becomes 15 bits.

Similarly, assuming that the correctable error bit number is 4, as a result of the same procedure as above, the order of the minimal polynomial becomes the 24th order (=the 6th×4), and then the bit number of the error correcting code generated from the polynomial becomes 24 bits, which increases significantly as compared with the case of the correctable error bit number being 3.

Therefore, the data up to 3 bits in size can be corrected using a 15-bit error correcting code generated from the above generating polynomial, so that the correcting capability required for correcting 16 bits, which is necessary for a track number, can be realized with a minimal redundancy.

As stated above, according to Embodiment 1, the situation for agreement between the generated error correcting code of a segment number and the generated error correcting code of a track number can be prevented, whereby synchronization of addresses can be established uniquely. In addition, since the state discriminating means for checking the validity of the synchronous detection becomes unnecessary, an address demodulator can be structured with a relatively simple mechanism, and at the same time the system can operate at high speed.

In the above embodiment, timing signals for the timing for detecting address data, the timing for activating the error detector for synchronous detection, and the timing for demodulating a track number are obtained by using a PLL clock generated by frequency division from a clock pit. This is not limited to the method, but a suitable clock may be used depending on their linear speeds and recording densities. In such a case, an accurate timing signal can be obtained by making the clock pit in phase with the edge of a fixed clock.

In FIGS. 1A, 1B, and 2 referred to in Embodiment 1, the wobble pits 107 and 108 are arranged so that the tracking polarities of their adjacent tracks are different from each other. However, this is not limited to such an arrangement, but the tracking polarities of the adjacent tracks may be the same.

Embodiment 2

The following describes an optical disk according to Embodiment 2 of the present invention, with reference to the drawings. The construction of the optical disk and the construction of the address data according to Embodiment 2 of the present invention are shown by FIGS. 1A, 1B, and 2 in the same manner as in Embodiment 1. That is, a prerequisite for this Embodiment also is a distributed arrangement of address information on a disk.

As one of the methods for detecting synchronization of addresses without a special synchronous pattern, there is a method of detecting that an output from a CRC error detector becomes zero. However, if '0's in a number as many as the total number of bits of the segment number and the accompanying error detection code are input into the error detector, an output from the error detector also becomes '0', which would cause an incorrect synchronous detection.

In the case of such an incorrect synchronous detection, the detected segment number also is '0'. Therefore, by using a value other than '0' as the segment number and judging that, if the detected segment number is '0', the detection is incorrect synchronous detection, synchronous detection at the incorrect timing can be prevented.

Figure 9:
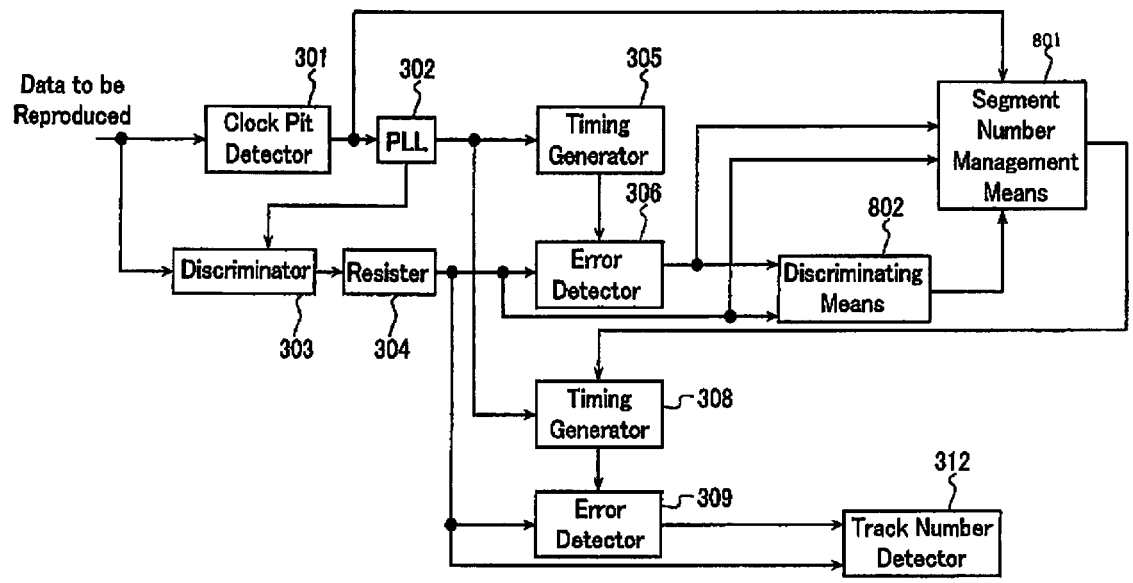
FIG. 9 shows a construction of an address demodulator using the optical disk according to Embodiment 2 of the present invention.

For instance, in FIG. 9, a discriminating means 802, into which output signals from a register 304 and an error detector 206 are input, outputs '1' if an output from the error detector is '0' and the number of bits equal to the segment number from higher order in the register (8 bits in Embodiment 2) is a value other than '0'.

If an output from the discriminating means is '1', a segment number detector 801 judges that an adequate segment number has been detected and detects the segment number.

Similarly, if an output from the discriminating means is '1', a timing generator 308 that generates a timing signal for detecting a track number judges that an adequate segment number has been detected and synchronization of addresses has been established, and generates a timing signal for detecting a track number.

As stated above, according to Embodiment 2, if the detected segment number is '0', the detection can be judged as incorrect synchronous detection, so that synchronous detection at the incorrect timing can be prevented.

Embodiment 3

The following describes an optical disk according to Embodiment 3 of the present invention, with reference to the drawings. The construction of the optical disk and the construction of the address data according to Embodiment 3 of the present invention are shown by FIGS. 1A, 1B, and 2 in the same manner as in Embodiment 1. That is, a prerequisite for this Embodiment also is a distributed arrangement of address information on a disk. Further, the tracking polarities of adjacent tracks are made different from each other.

In Embodiment 3, the same track number is used for the two tracks 103 and 104 shown in FIG. 2 whose numbers were 203 and 205 in the above embodiments. These tracks can be discriminated from each other because the polarities of the tracking signals in the adjacent tracks are reversed.

Figure 10:
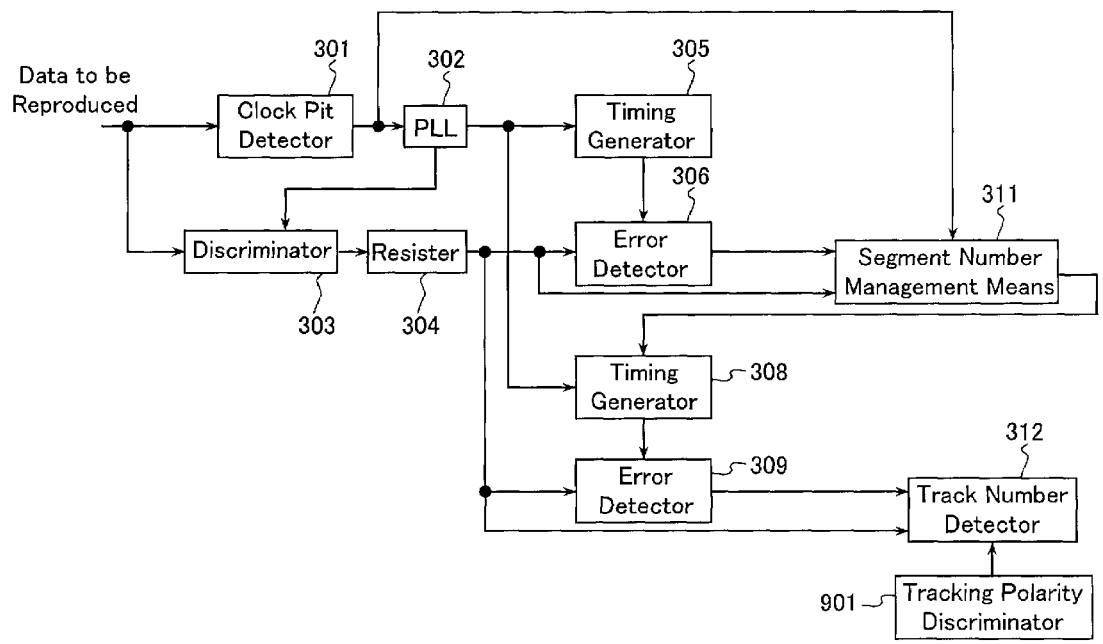
FIG. 10 shows a construction of an address demodulator using the optical disk according to Embodiment 3 of the present invention.
Figure 11A:
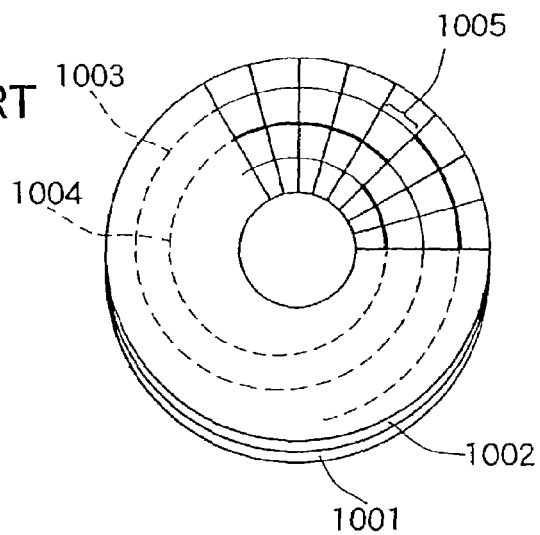
FIG. 11A is a plan view showing a construction of the prior art optical disk.
Figure 11B:
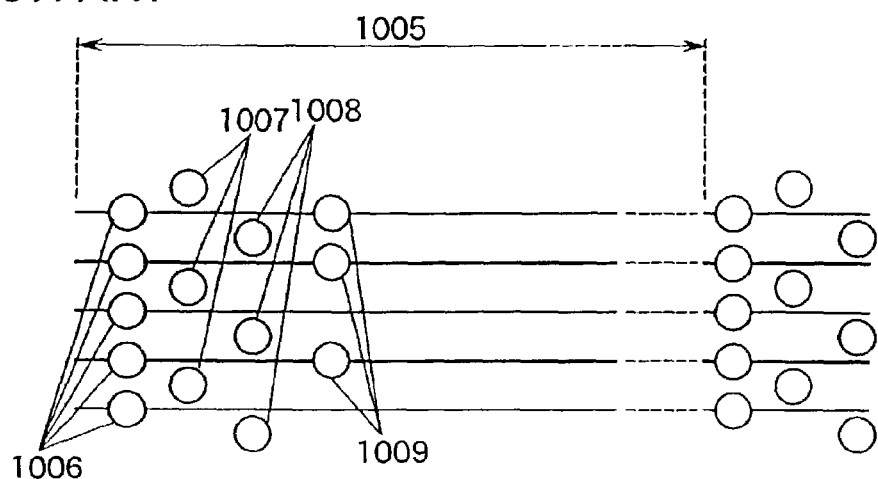
FIG. 11B shows a construction of a segment in the prior art optical disk.
Figure 12:
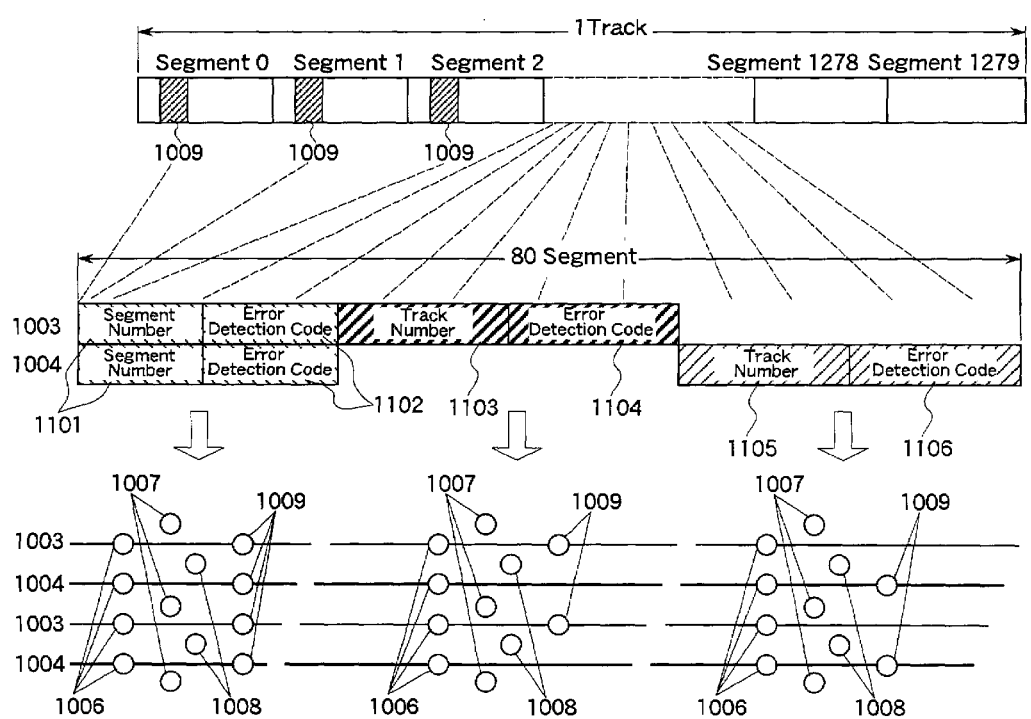
FIG. 12 shows a structure of address data in the prior art optical disk.

That is, when demodulating track numbers, an output from a tracking polarity discriminator 901 is used as a lower 1 bit as shown in FIG. 10. Thereby, even when the adjacent tracks have the same track number, judgment concerning addressing as to which tracks becomes possible. As a result, the number of bits used for the track number can be lowered by one bit, and thus a storage capacity of the optical disk itself can be increased.

INDUSTRIAL APPLICABILITY

As stated above, according to the optical disks of the present invention, reliable address data can be detected without the need of checking the validity of synchronous detection of segment numbers at each detection.

What is claimed is:

1. An optical disk having one or more tracks on which address data is arranged in a distributed manner, the address data comprising a segment number that represents location information in a rotation direction of the disk, an error detection code of the segment number, a track number that represents location information in a radial direction of the disk, and an error detection code of the track number, wherein
    only the address data is used for for synchronous detection of the address data, and
    the error detection code of the segment number and the error detection code of the track number are generated using different generating polynomials.

2. The optical disk according to claim 1, wherein an error correcting code is used as the error detection code of the track number.

3. The optical disk according to claim 2, wherein an error correcting code configured for correction in bits is used as the error correcting code.

4. The optical disk according to claim 3, wherein the track number is 16 bits in size, and the error correcting code that accompanies the track number is at least 15 bits in size.

5. The optical disk according to claim 2, wherein the track number is 16 bits in size, and the error correcting code that accompanies the track number is at least 15 bits in size.

6. The optical disk according to claim 1, wherein adjacent tracks have different tracking polarities and
    a pair of adjacent recorded tracks has the same track number.

7. An optical disk having one or more tracks on which address data is arranged in a distributed manner, the address data comprising a segment number that represents location information in a rotation direction of the disk, an error detection code of the segment number, a track number that represents location information in a radial direction of the disk, and an error detection code of the track number,
    wherein only the address data is used for synchronous detection of the address data, and
    the segment number has a value other than zero.

8. The optical disk according to claim 7, wherein adjacent tracks have different tracking polarities and a pair of adjacent recorded tracks has the same track number.

9. An optical disk apparatus comprising an optical disk having one or more tracks on which address data is arranged in a distributed manner, the address data comprising a segment number that represents location information in a rotation direction of the disk, an error detection code of the segment number, a track number that represents location information in a radial direction of the disk, and an error detection code of the track number,
    wherein only the address data is used for synchronous detection of the address data,
    the segment number has a value other than zero, and
    if detecting that the segment number is zero, synchronous detection of the address data is not conducted.

10. An optical disk apparatus comprising an optical disk having one or more tracks on which address data is arranged in a distributed manner, the address data comprising a segment number that represents location information in a rotation direction of the disk, an error detection code of the segment number, a track number that represents location information in a radial direction of the disk, and an error detection code of the track number,
    wherein only the address data is used for synchronous detection of the address data, and
    the error detection code of the segment number and the error detection code of the track number are generated using different generating polynomials, and
    synchronous detection of the address data is conducted using the segment number.

* * * * *

UNITED STATES PATENT AND TRADEMARK OFFICE
CERTIFICATE OF CORRECTION

PATENT NO. : 6,968,496 B1
DATED : November 22, 2005
INVENTOR(S) : Matsumoto et al.

It is certified that error appears in the above-identified patent and that said Letters Patent is hereby corrected as shown below:

<u>Title page,</u>
Item [56], References Cited, FOREIGN PATENT DOCUMENTS,
"63-287079" should read -- 61-287079 --.

<u>Column 13,</u>
Line 36, "is used for for" should read -- is used for --.

Signed and Sealed this

Fourth Day of April, 2006

JON W. DUDAS
*Director of the United States Patent and Trademark Office*